United States Patent
Gagnon et al.

(10) Patent No.: US 7,365,335 B2
(45) Date of Patent: Apr. 29, 2008

(54) POSITRON EMISSION TOMOGRAPHY TIME-OF-FLIGHT LIST MODE RECONSTRUCTION WITH DETECTOR RESPONSE FUNCTION

(75) Inventors: Daniel Gagnon, Twinsburg, OH (US); Joel Karp, Glenside, PA (US); Lucretiu M. Popescu, Philadelphia, PA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 79 days.

(21) Appl. No.: 11/464,534

(22) Filed: Aug. 15, 2006

(65) Prior Publication Data
US 2007/0040123 A1    Feb. 22, 2007

Related U.S. Application Data

(60) Provisional application No. 60/595,930, filed on Aug. 18, 2005.

(51) Int. Cl.
*G01T 1/166*    (2006.01)
(52) U.S. Cl. ................................. 250/363.04
(58) Field of Classification Search .......... 250/363.01, 250/363.02, 363.03, 363.04, 363.05, 363.06, 250/363.07, 363.08, 363.09, 363.1, 370.09, 250/269.3, 269.5, 269.7
See application file for complete search history.

(56) References Cited

U.S. PATENT DOCUMENTS

| | | | |
|---|---|---|---|
| 5,122,667 A | | 6/1992 | Thompson |
| 5,323,007 A | * | 6/1994 | Wernick et al. ........ 250/363.03 |
| 6,448,560 B1 | | 9/2002 | Tumer |
| 6,484,051 B1 | | 11/2002 | Daniel |
| 7,057,178 B1 | | 6/2006 | Manjeshwar et al. |
| 7,205,546 B1 | * | 4/2007 | Kennedy ............... 250/363.02 |
| 2004/0195512 A1 | | 10/2004 | Crosetto |
| 2005/0104001 A1 | | 5/2005 | Shah |
| 2006/0097175 A1 | | 5/2006 | Ganin et al. |
| 2006/0102845 A1 | | 5/2006 | Williams et al. |
| 2006/0138315 A1 | | 6/2006 | Williams et al. |
| 2006/0145082 A1 | | 7/2006 | Stearns et al. |
| 2006/0163485 A1 | | 7/2006 | Stearns et al. |

OTHER PUBLICATIONS

Selivanov, V.V., et al.; Detetor Response Models for Statistical Iterative Imaging Reconstruction in High Resolution PET; IEEE Trans. on Nuclear Science; 47(3)1168-1175.
Lewellen, T.K.; Time-of-Flight PET; 1998; Seminars in Nuclear Medicine; 28(3)268-275.
Mallon, A., et al.; Three-dimensional PET reconstruction with time-of-flight measurement; 1992; Physics in Medicine and Biology; 37(3)717-729.

\* cited by examiner

*Primary Examiner*—David P. Porta
*Assistant Examiner*—Kiho Kim

(57) ABSTRACT

A PET system includes an improved image reconstruction algorithm based on an improved modeling of the point-spread function. PET time of flight data is used to obtain a mean emitting point and a time of flight probability function. This information is then used to model the point-spread function. The time of flight probability function and the detector response function are used to define a probability volume for a given line of response, which is then used in the reconstruction of the image.

20 Claims, 4 Drawing Sheets

POSITRON EMISSION TOMOGRAPHY TIME-OF-FLIGHT LIST MODE RECONSTRUCTION WITH DETECTOR RESPONSE FUNCTION

CROSS REFERENCE TO RELATED APPLICATIONS

This application claims the benefit of U.S. provisional application Ser. No. 60/595,930 filed Aug. 18, 2005, which is incorporated herein by reference.

BACKGROUND

Use of Positron Emission Tomography (PET) is growing in the field of medical imaging. In a PET imaging system, a radionuclide is introduced into the object to be imaged. The radionuclide emits positrons. When an emitted positron collides with an electron, an annihilation event occurs, wherein the positron and electron are destroyed. The result of the annihilation event is the production of two gamma rays traveling essentially at 180 degrees from one another. PET imaging systems use detectors positioned across from one another to detect the gamma rays emitting from the object. Typically a ring of detectors is used in order to detect gamma rays coming from each angle.

The collection of a large number of events creates the necessary information for object to be estimated through tomographic reconstruction. Those events, connecting to detector elements, form line-of-response (LOR) that can be histogrammed according to their geometric attributes to define projections, or sinograms to be reconstructed. Events can also be added to the image individually.

The fundamental element of the data collection and image reconstruction is therefore the LOR: a line traversing the system patient aperture. Additional information can obtained on the location of the event. First, it is known that, through sampling and reconstruction, the ability of the system to reconstruct (position) a point is not space invariant across the field of view; better in the center, slowly degrading toward the periphery. The point-spread-function (PSF) is typically used to characterize this behavior. Tools have been developed to incorporate the PSF into reconstruction process. Second, the time-of-flight (TOF), or time differential between the arrival of the gamma ray on each detector involved in the detection of the pair, can be used to limit along the LOR, where the event is more likely to have occurred.

The PSF is three-dimensional in nature and typically varying from an isotropic 4 to 6 mm in the center of the scanner, to highly skewed ellipsoid ranging from 6 to 8 mm at the periphery. TOF information can be converted into a spatial knowledge (through the conversion of the speed of travel of the two gamma). Typically, the TOF information would result in a localization of the event in the order of 10-12 cm down to few centimeters with very fast scanner.

As such, it is desirable to provide a method and means for using all the available information on the LOR during the reconstruction.

SUMMARY OF THE INVENTION

The present invention is directed to an improved reconstruction algorithm for imaging processes. An imaging system, such as a PET system incorporates simultaneously the modeling of the detector point spread function and the knowledge of the TOF in order to improve the overall quality of the reconstructed image.

In one embodiment, time of flight data is used to determine a mean emitting point and a time of flight probability function. The mean emitting point and time of flight probability function is in turn used to define the detector response function. The time of flight probability function and the detector response function are then used to define a probability volume, such as, for example, a ellipsoid. The voxels within the probability volume are used in the reconstruction algorithm for a given line of response. This process improves the overall quality of the reconstructed image without requiring a substantial increase in processing time.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to illustrate the principles of this invention. One skilled in the art should realize that these illustrative embodiments are not meant to limit the invention, but merely provide examples incorporating the principles of the invention.

DESCRIPTION OF THE INVENTION

The PET system disclosed herein provides a method and means for accurately modeling the PSF such that the PSF can be used to provide improved image reconstruction in an acceptable processing time. The PET system models the PSF in conjunction with PET Time-of-Flight (TOF) data in list mode. The PET system effectively provides a more accurate PSF model and also limits the computations by limiting the number of voxels that can contribute to point of origin for the gamma rays detected.

Figure 1:
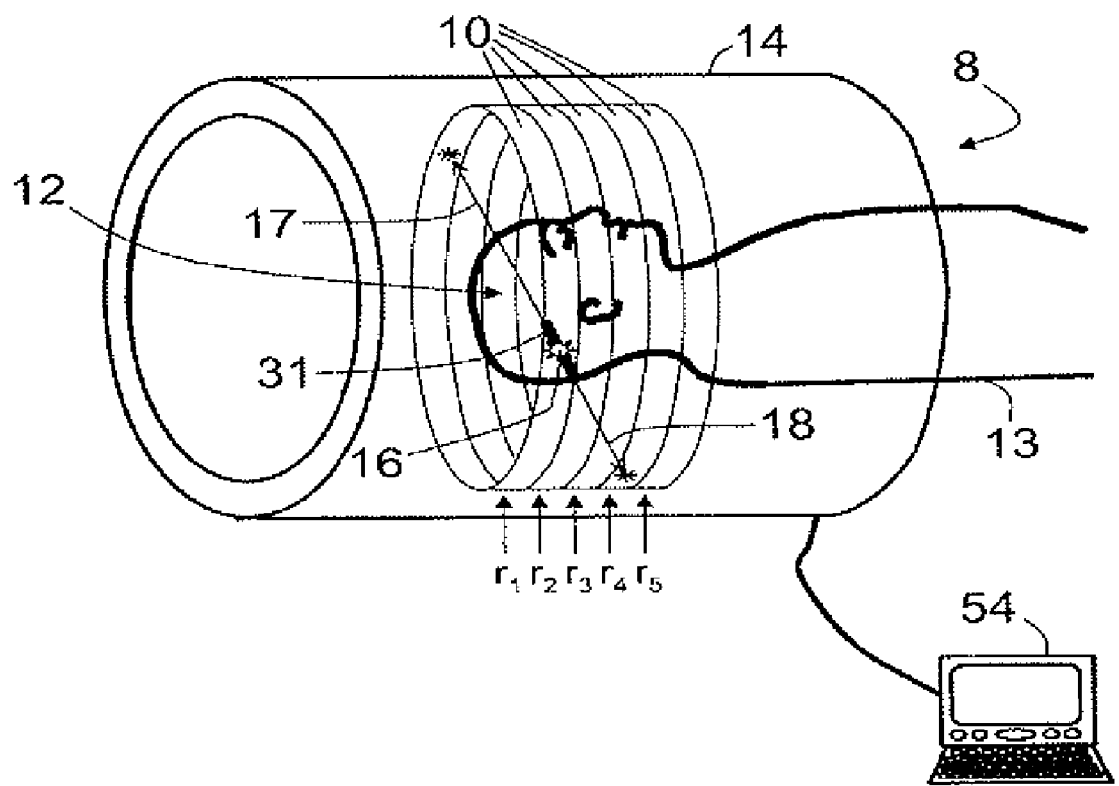
FIG. 1 illustrates a PET imaging system.

FIG. 1 illustrates a PET system 8 including a plurality of detector rings 10, an imaging region 12, an object to be imaged 13, and a gantry or housing 14. The object to be imaged 13, which includes a positron-emitting radionuclide therein, is placed in the imaging region 12 within the housing 14. As the positrons are emitted from the radionuclide, they collide with electrons producing an annihilation event 16. The annihilation event 16 produces two gamma rays 17, 18 traveling in opposite directions along the line of response 31. The gamma rays 17, 18 are then detected by the detector rings 10 and a signal is sent the processing unit 54. The PET system 8 may include any number of detector rings 10, five of which ($r_1$, $r_2$, $r_3$, $r_4$, $r_5$) are shown in FIG. 1.

Figure 2:
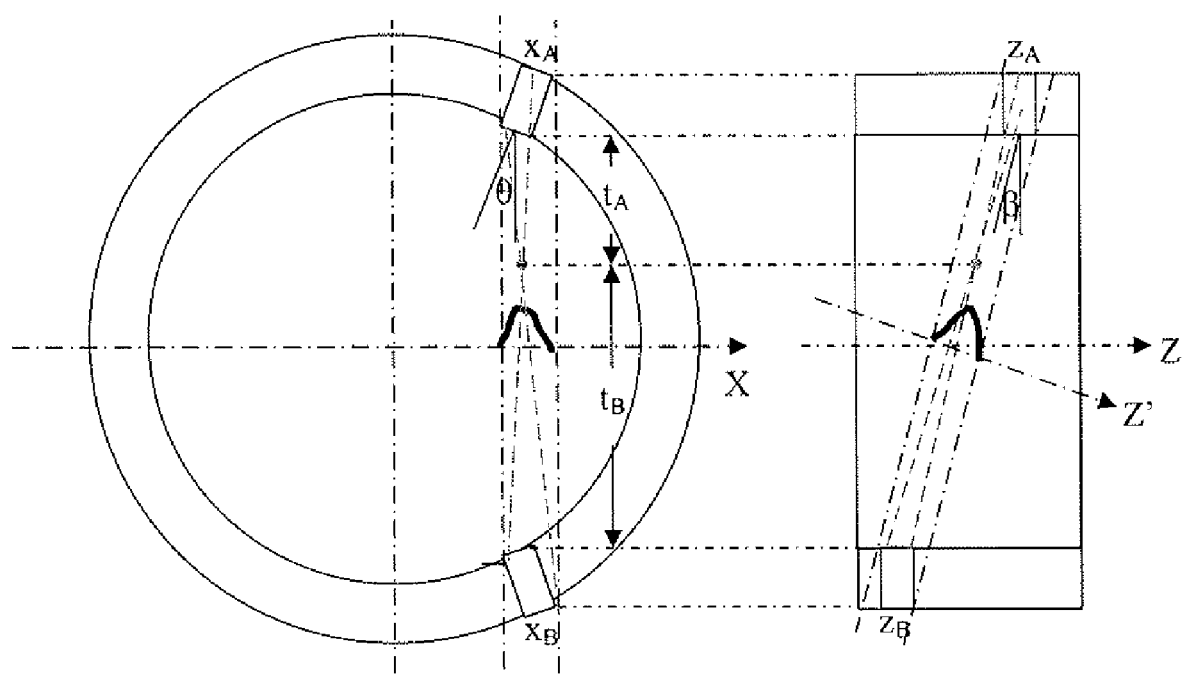
FIG. 2 illustrates a model of the DRF for a 3D PET ring scanner.

The processing unit 54 uses information from the detectors 10 along with reconstruction algorithms to produce an image of the object. The reconstruction algorithm includes PSF modeling to determine the point of origin for each gamma ray detected. In two-dimensional PET, the detector response is a two-dimensional function of X and $\epsilon$ as shown in FIG. 2, wherein X is the radial position of the line of response (LOR) and $\epsilon$, which is equal to $t_A/t_B$, is the relative tangential position of the emitting gamma ray along the LOR. The PSFs at the center of the transverse field of view have a narrower and more centered profile than those that the peripheral transverse field of view. The PSF is quite asymmetrical with respect to X for peripheral LORs. The PSF is narrower at $\epsilon=1$ (emitting point is at the middle of the LOR) and gets wider toward small $\epsilon$ (emitting point is close to one of the detectors). In this respect, inaccurate DRF modeling produces image quality issues that are more severe at the peripheral transverse field of view.

For three-dimensional PET, the PSF is a four-dimensional function of X, $\epsilon$, Z' and $\beta$, as shown in FIG. 2. As shown, Z' is the axis perpendicular to the LOR in the axial direction, $\beta$ is the axial tilt angle of the LOR and the X-Z' plane is orthogonal to the LOR.

Figure 3:
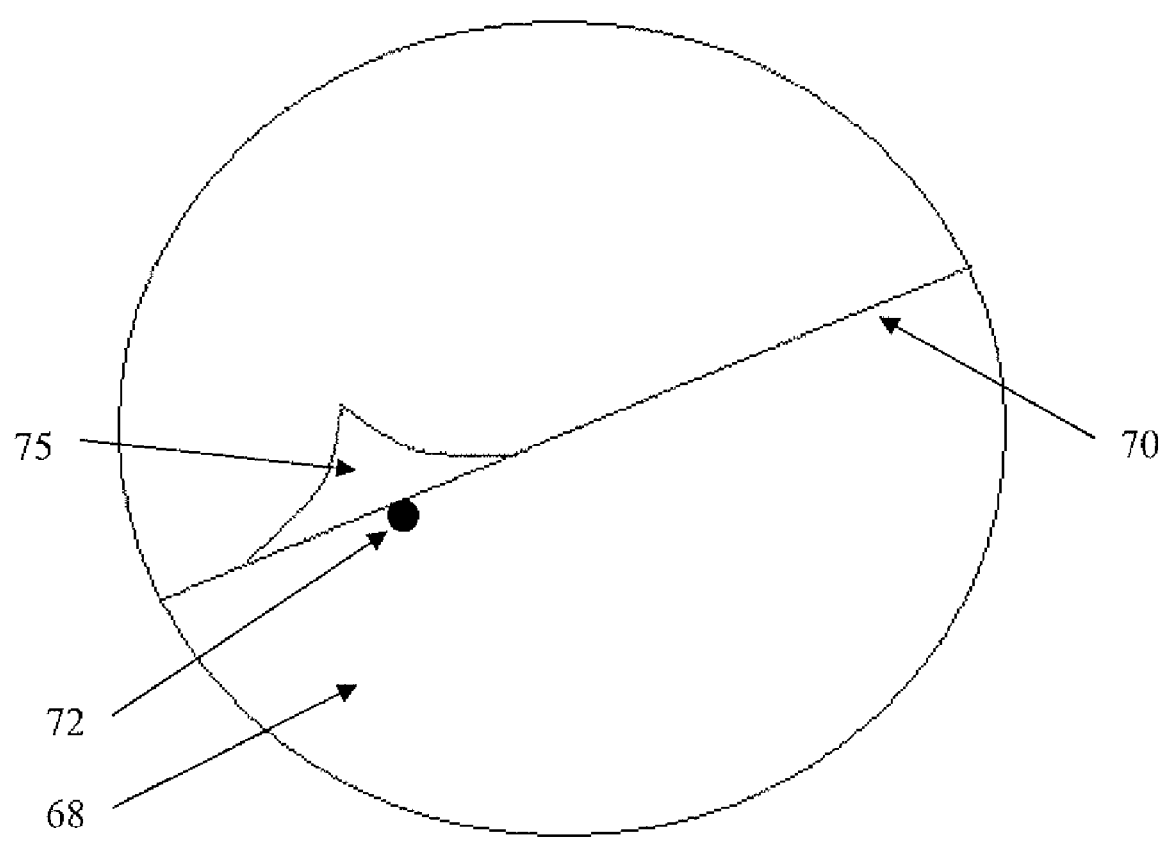
FIG. 3 illustrates time stamp data providing a mean emitting point and a probTOF.

Since PET systems produce gamma rays that are always at 180 degrees from one another, Time-of-Flight (TOF) algorithms can be used to help determine the point of origin along the LOR. For example, as shown in FIG. 3, a PET field of view 68 is shown with a LOR 70 determined from a coincidence gamma ray pair. Based on the difference in detection time of the coincidence pair and the known diameter of the field of view 68, a mean emitting point 72 can be determined along the LOR 70. However, pinpoint accuracy of the emitting point cannot be determined. Instead, the emitting point can be expressed as probability function (probTOF) 75 for all the points along the LOR 70 As shown in FIG. 3, the probTOF 75 is a Gaussian-like function with the greatest probability at the mean emitting point 72.

Figure 4:
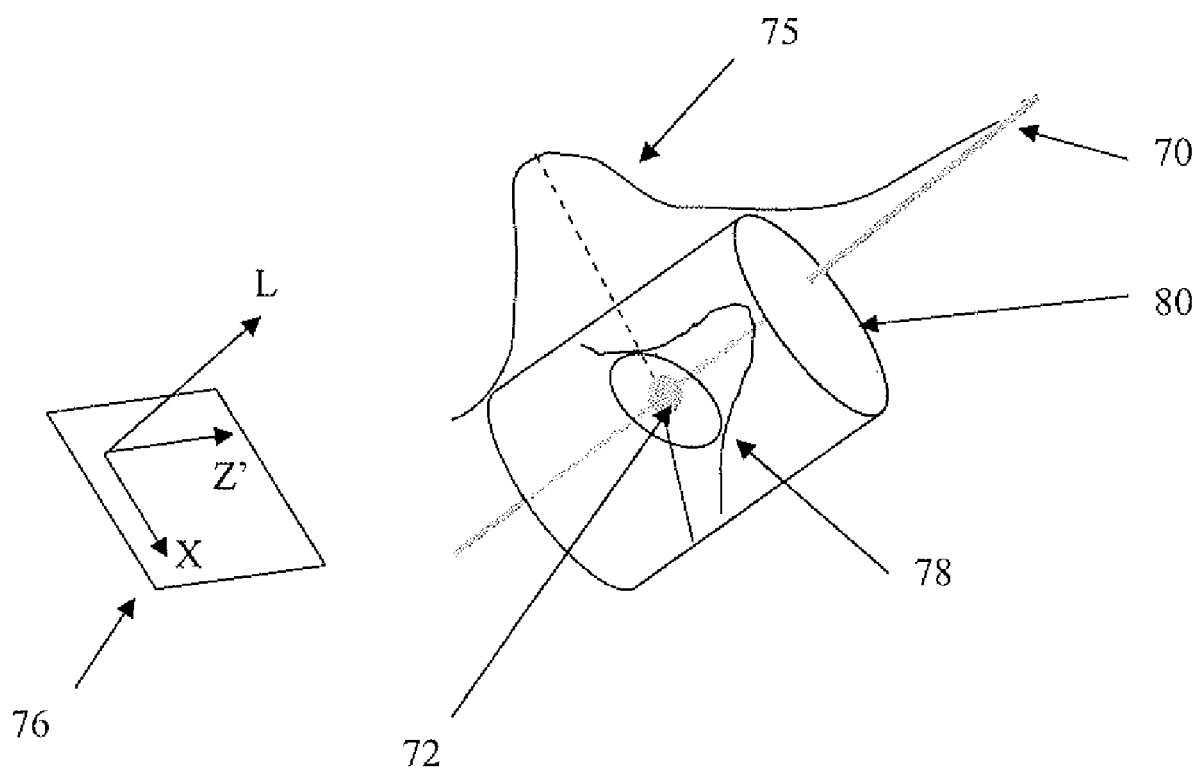
FIG. 4 illustrates a probability ellipsoid for the point of origin of a coincidence gamma ray pair based on modification of the DRF based on the probTOF.

Data from the detectors 10 can be fed into the processing unit 52 and may include a time stamp for each gamma ray detected. The time stamps can be used to determine the mean emitting point 72 and the probTOF 75, The mean emitting point 72 and the probTOF 75 can be used to more precisely model the DRF. FIG. 4 illustrates a reconstruction algorithm that uses the mean emitting point 72 and probTOF 75 to modify the DRF. Coordinate axis are shown for reference as 76. The coincidence detection produces a LOR 70 and the time stamps are used to determine a mean emitting point 72 and a probTOF 75, wherein probTOF is a function of L. A DRF 78 can be calculated based on the mean emitting point 72, wherein DRF is a function of X, Z' and L=1. For a given LOR 70, only voxels inside the ellipsoid 80 can contribute to the LOR 70. The boundaries of the probability ellipsoid 80 are defined by the probTOF 75 and DRF 78. More specifically, the boundaries of the probability ellipsoid 80 are determined by the nonzero region of probTOF 75 in the LOR direction and by the nonzero region of the DRF 78 in the X-Z', L=1 plane. Alternatively, the probability volume 80 may be defined by a predetermined portion of the probTOF, a predetermined portion of the DRF, or a predetermined portion of the probTOF and a predetermined portion of the DRF. By changing the predetermined portion (s), the shape of the probability volume is changed and the number of voxels within the probability volume can be reduced. For example, the probTOF and/or DRF may be calculated for one or two standard deviations from the mean emitting point.

Since the PSF can be a function of the relative tangential position $\epsilon$, the contour of the ellipsoid for each fixed L=1 can be different. The intersection weight of each voxel with the LOR is simply the product of probTOF(L) and PFS in the (X, Z', L=1) plane. Therefore, in the forward projection, for a given LOR, all of the voxels inside the probability ellipsoid 80 must be projected with its TOFprob and DRF weight. In a back-projection, for a give LOR, the corrected LOR is weighted appropriately and assigned to each voxel within the ellipsoidprobability cylinder. It should be noted that the probability volume 80 may be any three-dimensional shape as determined by the TOFprob and DRF, and thus the scope of this invention is not intended to be limited to a specific geometrical probability shape.

Consequently, with TOF list mode data, for each measured LOR, the coincidence gamma ray emitting position is known and is within the time resolution of the scanner. The PSF is modeled for a limited range of object voxels along the LOR based on the mean emitting point 72 and a probTOF 75. The reduction in the number of calculations required vastly improves the image reconstruction time for algorithms that accurately model the DRF. The accurate modeling of the PSF allows images to be generated with much better resolution and overall quality.

The invention has been described with reference to one or more preferred embodiments. Clearly, modifications and alterations will occur to other upon a reading and understanding of this specification. For example, the present invention is not intended to be limited to PET systems, but may include imaging systems with different modalities, such as, for example a combined PET/CT system or a combined PET/MR system. It is intended to include all such modifications and alterations insofar as they come within the scope of the appended claims or equivalents thereof.

The invention claimed is:

1. A PET imaging system comprising:
   (a) one or more detectors for detecting gamma rays emitting from an object to be imaged; and
   (b) a processing unit coupled to said one or more detectors, said processing unit comprising:
      i) a means for assigning time stamps to each gamma ray detection event;
      ii) a means for determining coincidence pairs from said time stamps;
      iii) a means for determining a mean emitting point and a time of flight probability function for each coincidence pair;
      iv) a means for determining a detector point spread function based on the mean emitting point and the time of flight probability function for each coincidence pair;
      v) a means for determining a probability volume based on the time of flight probability function and the detector response function for each coincidence pair; and
      vi) a means for using the probability volume for each coincidence pair in a reconstruction algorithm to produce an image.

2. The PET imaging system of claim 1, wherein said probability volume is an ellipsoid.

3. The PET imaging system of claim 1, wherein the means for using the probability volume for each coincidence pair in a reconstruction algorithm to produce an image comprises using an intersection weight of the time of flight probability function and the detector response function for each coincidence pair.

4. The PET imaging system of claim 1, wherein the probability volume for each coincidence pair is partly defined by the nonzero region of the time of flight probability function for each coincidence pair.

5. The PET imaging system of claim 1, wherein the probability volume fix each coincidence pair is partly defined by the nonzero region of the detector response function for each coincidence pair.

6. The PET imaging system of claim 1, wherein the probability volume for each coincidence pair is defined by the nonzero region of the time of flight probability function and by the nonzero region of the detector response function for each coincidence pair.

7. The PET imaging system of claim 1, wherein the probability volume for each coincidence pair is defined by a predetermined portion of the time of flight probability function for each coincidence pair.

8. The PET imaging system of claim 1, wherein the probability volume for each coincidence pair is defined by a predetermined portion of the detector response function for each coincidence pair.

9. The PET imaging system of claim 1, wherein the probability volume for each coincidence pair is defined by a predetermine portion of the time of flight probability function and a predetermined portion of the detector response function for each coincidence pair.

10. The PET imaging system of claim 9, wherein at least one or said predetermined portion of the time of flight probability function and said predetermined portion of the detector response function for each coincidence pair is approximately equal to two standard deviations from said mean emitting point.

11. The PET imaging system of claim 1 further comprising a different modality imaging system.

12. A method of producing a PET image comprising:
 (a) detecting gamma ray emissions from an object to be imaged;
 (b) assigning time stamps to each of said gamma rays detected;
 (c) determining coincidence gamma ray pairs;
 (d) determining a mean emitting point and a time of flight probability function for each coincidence pair;
 (e) determining a detector response function based on the mean emitting point and the time of flight probability function for each coincidence pair;
 (f) determining a probability volume based on the time of flight probability function and the detector response function for each coincidence pair; and
 (g) using the probability volume for each coincidence pair in a reconstruction algorithm to produce an image.

13. The method of claim 12, wherein said probability volume for each coincidence pair is an ellipsoid.

14. The method of claim 12, wherein the probability volume for each coincidence pair is defined by a predetermined portion of the time of flight probability function for each coincidence pair.

15. The method of claim 12, wherein the probability volume for each coincidence pair is defined by a predetermined portion of the detector response function for each coincidence pair.

16. The method of claim 12, wherein the probability volume for each coincidence pair is defined by a predetermine portion of the time of flight probability function and a predetermined portion of the detector response function for each coincidence pair.

17. The method of claim 16, wherein at least one or said predetermined portion of the time of flight probability function and said predetermined portion of the detector response function for each coincidence pair is approximately equal to two standard deviations from said mean emitting point.

18. An image reconstruction processor comprising:
 (a) a means for assigning time stamps to gamma ray detection event;
 (b) a means for determining coincidence pairs from said time stamps;
 (c) a means for determining a mean emitting point and a time of flight probability function for each coincidence pair;
 (d) a means for determining a detector response function based on the mean emitting point and the time of flight probability function for each coincidence pair;
 (e) a means for determining a probability volume based on the time of flight probability function and the detector response function for each coincidence pair; and
 (f) a means for using the probability volume for each coincidence pair in a reconstruction algorithm to produce an image.

19. The image reconstruction processor of claim 18, wherein said probability volume for each coincidence pair is an ellipsoid.

20. The image reconstruction processor of claim 18, wherein the means for using the probability volume for each coincidence pair in a reconstruction algorithm to produce an image comprises using an intersection weight of the time of flight probability function and the detector response function for each coincidence pair.

* * * * *